June 9, 1964 H. TAUSCHER 3,136,304
ROTARY POWER DEVICE
Filed Aug. 23, 1960 3 Sheets-Sheet 1
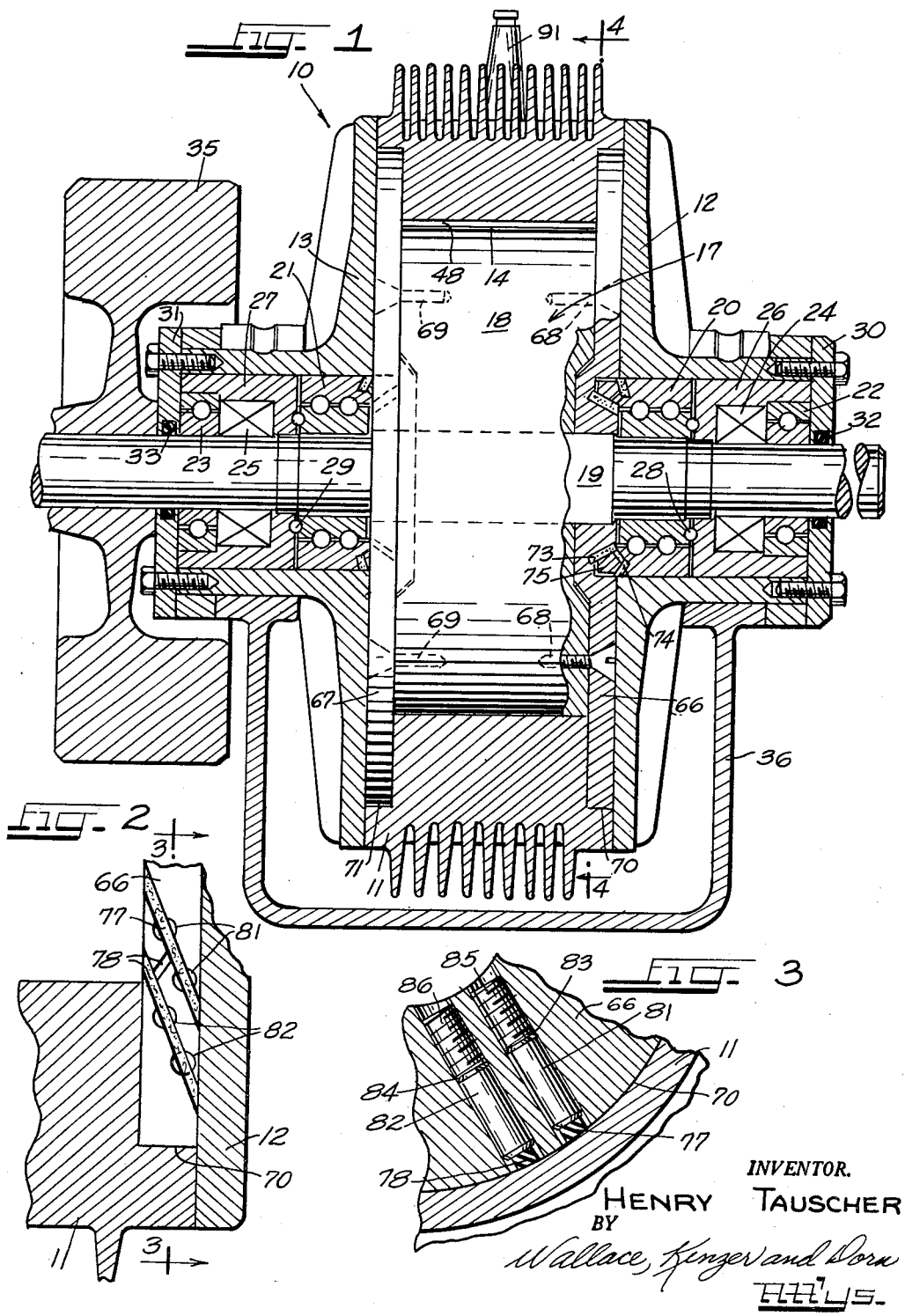
INVENTOR.
HENRY TAUSCHER
BY
Wallace, Kinzer and Dorn
ATT'YS.

June 9, 1964 H. TAUSCHER 3,136,304
ROTARY POWER DEVICE
Filed Aug. 23, 1960 3 Sheets-Sheet 2
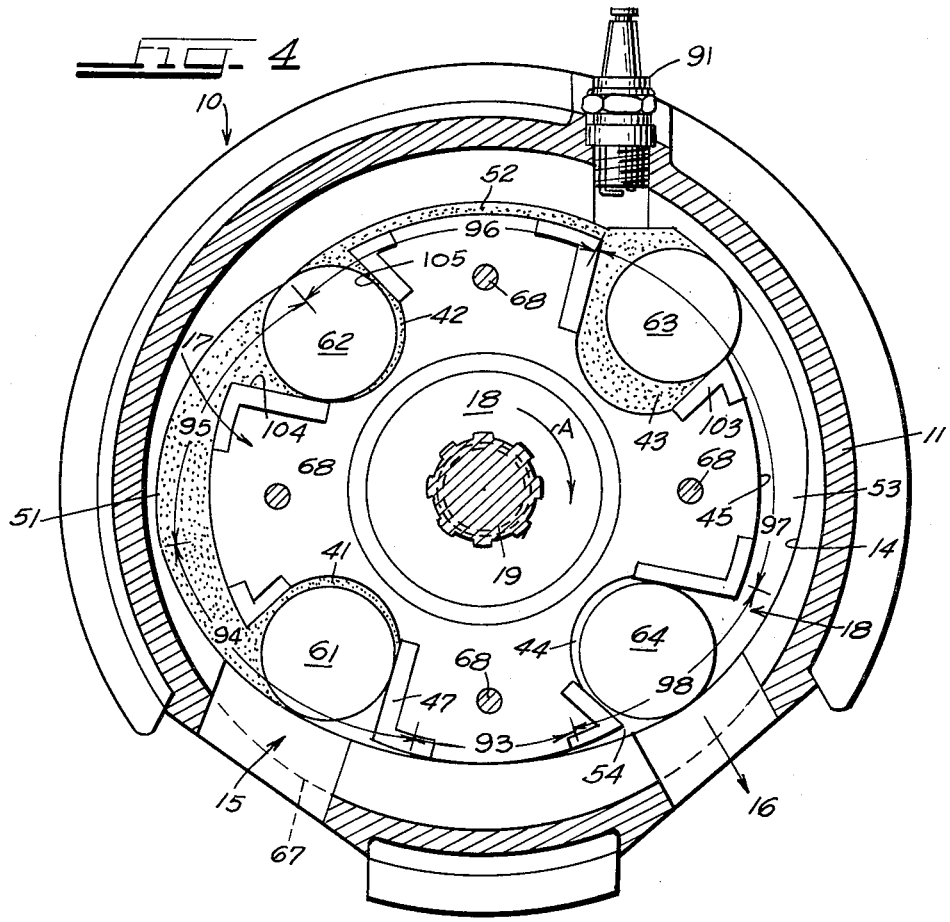
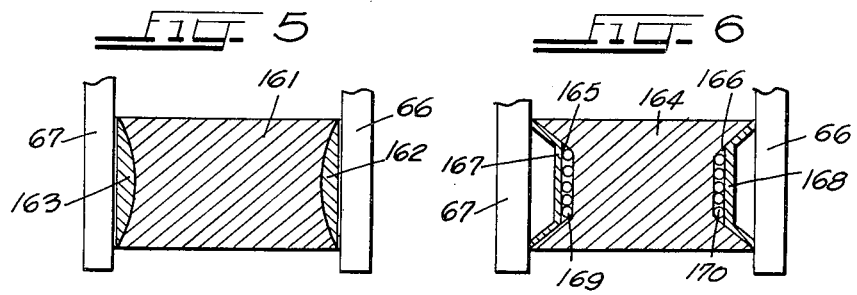
INVENTOR.
HENRY TAUSCHER
BY
Wallace, Kinzer and Horn
ATT'YS

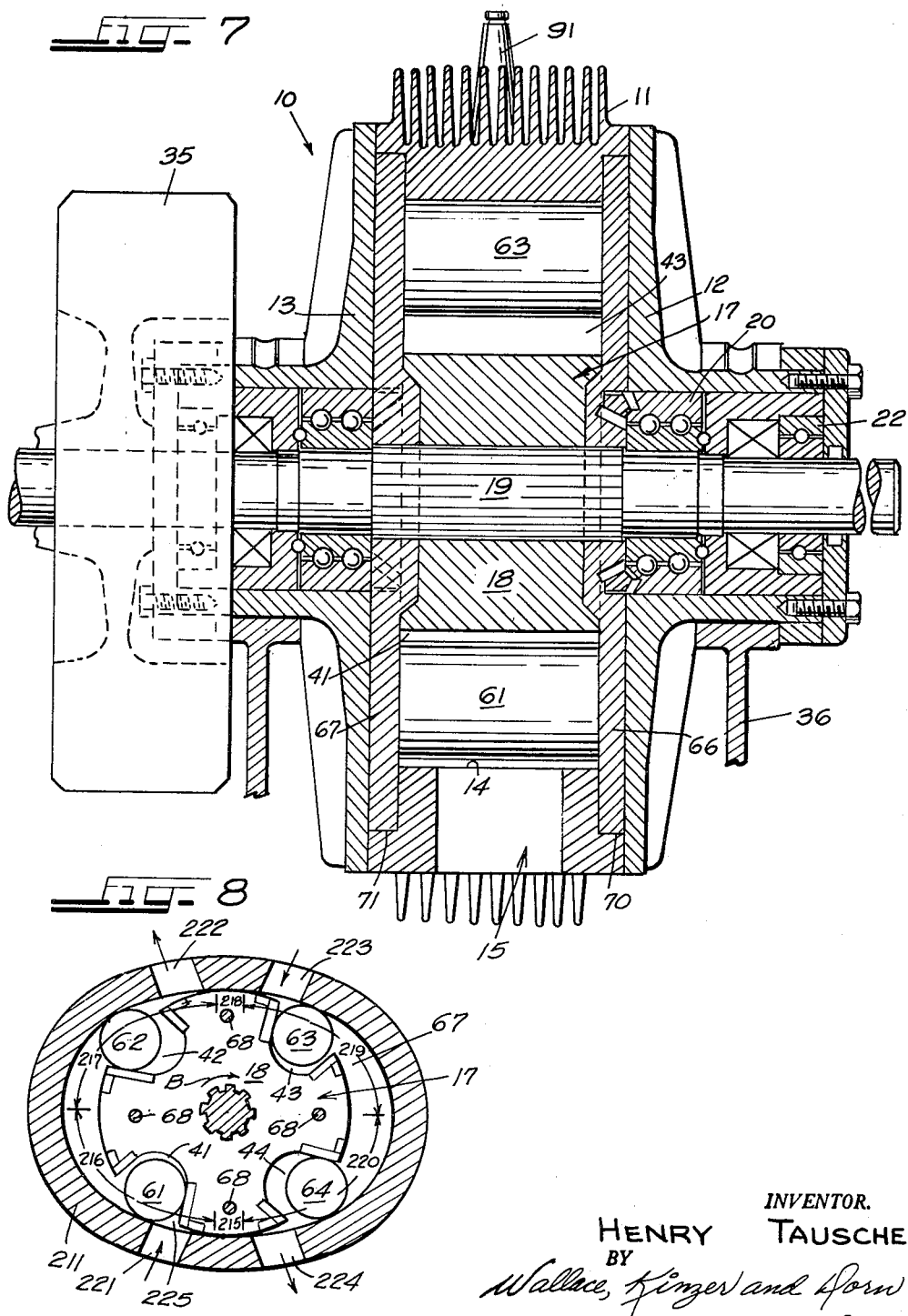

United States Patent Office 3,136,304
Patented June 9, 1964

3,136,304
ROTARY POWER DEVICE
Henry Tauscher, 809 Fillmore, Oak Park, Ill.
Filed Aug. 23, 1960, Ser. No. 51,402
6 Claims. (Cl. 123—16)

This invention relates to a new and improved rotary power device. More particularly, the invention relates to a new and improved means for sealing of individual operating chambers in a rotary power device of the kind comprising a generally elliptical stator disposed in encompassing relation to a rotor having a plurality of radially movable sealing members which segregate the space between the rotor and the stator into individual operating chambers. The invention is particularly advantageous as applied to an internal combustion engine, and is described in that connection, but is also applicable to compressor pumps, turbines, and other rotary power apparatus.

In most conventional internal combustion engines, the compression chamber is defined by one or more pistons mounted within suitable operating cylinders, the linear movement of the pistons being translated into rotary motion of a shaft, or the like, by suitable mechanical linkages. Another type of engine, which has been much less successful on a commercial basis, is the rotary engine, in which linearly movable pistons are not used. An early example of a rotary engine of this general kind is shown in United States Patent No. 813,018, issued February 20, 1906, to M. S. Okun. This particular engine is similar to a rotary compressor pump of the kind using radially movable vanes. That is, the motor comprises a hollow stator having a substantially elliptical inner surface. Within this stator there is mounted a rotor which is circular in cross-sectional configuration. A plurality of radially movable vanes are mounted in slots in the rotor and extend outwardly thereof into engagement with the inner surface of the stator, being held in engagement with the stator by centrifugal force and also by springs which impel the vanes outwardly of the rotor. A mixture of fuel and air is supplied to the space between the stator and rotor, at one point, and is compressed during rotation of the rotor until it reaches a point at which the compressed mixture is ignited. Thereafter, the air-fuel mixture burns and expands, ultimately being exhausted. The radially movable vanes, which divide the space between the rotor and stator into a series of operating chambers, make it possible to maintain the requisite compression and expansion operations within defined limits, so that a positive driving action for the rotor is achieved.

A number of difficulties and problems usually considered to be inherent in engines of the kind shown in the Okun patent have prevented general commercial acceptance of engines of this kind. In the first place, the vanes are in continuous high-speed sliding contact with the stator. Furthermore, substantial forces are applied to the vanes, driving them against the stator surface. As a consequence, the vanes tend to wear quite rapidly and frequently unevenly. When this occurs, sealing between individual operating chambers of the engine becomes less and less effective with the result that engine efficiency and performance deteriorate. A variety of relatively complex and expensive engine constructions have been proposed to avoid this basic problem. In general, however, these solutions have not been effective to reduce the rapid wear of the vane elements to an acceptable level or have increased the cost of construction of the engine so that it becomes prohibitive.

Another difficulty presented in engines of this kind relates to the fact that it is difficult to compensate for dimensional changes which occur during operation and which result primarily from heating of the engine parts. Thus, differential expansion between the rotor and the sliding vane may create leakage paths around the base portions of the vanes, substantially reducing the efficiency of the engine. Furthermore, the heating of the engine, in normal operation, accelerates the tendency toward wear and scoring of the moving elements of the engine. Consequently, although rotary devices of this kind have been used commercially as pumps, they have been less successful as engines or turbines.

It is a principal object of the invention, therefore, to provide a new and improved construction, and particularly a sealing means, for a rotary power device of the kind utilizing radially movable sealing elements between a rotor and a stator, which is effective to overcome or minimize the above-noted problems and difficulties of previously known devices.

It is another object of the invention to engage the individual sealing elements, in a rotary power device of the kind in which the operating space between a rotor and a stator is segregated into individual operating chambers by radially movable sealing elements, in rolling friction contact with both the rotor and the stator to reduce wear and erosion of the rotor, the stator, and the sealing elements.

A further object of the invention is to provide a new and improved sealing means for a rotary power device which is simple in construction and which provides for simple and convenient maintenance of the device. In particular, it is an object of the invention to provide a rotary internal combustion engine or similar power device in which a virtually complete overhaul of the device can be accomplished simply by removing and replacing a series of rollers used in the device as sealing elements.

Another object of the invention is to provide a new and improved rotor construction, for a rotary internal combustion engine or similar power device of the moving-vane type, which affords a better seal at the end of each moving vane or sealing element than can be achieved with previously known construction.

An additional object of the invention is to provide a new and improved rotary internal combustion engine or similar power device using radially movable sealing elements which comprise individual rollers, mounted within recesses in a rotor and extending outwardly of the recesses into rolling friction contact with a stator, that permit sealing at either side of the recess and thereby affording an automatic valving action during operation of the device.

A rotary power device constructed in accordance with the invention comprises a hollow stator having a generally elliptical inner surface which terminates in a pair of end surfaces, inlet and outlet ports being provided in the stator. Rotor means are mounted for rotation within the stator between its end surfaces. The rotor means comprise a rotor of circular cross-sectional configuration which defines, with the stator, a generally annular space of varying radial dimension. Moreover, the rotor is provided with a plurality of circumferentially spaced axially extending recesses in its outer surface. In the preferred embodiment described hereinafter, the rotor means may also include a pair of end plates mounted on the rotor and affording a seal between the end surfaces of the rotor and the inner end surfaces of the stator. The power device of the invention also includes means for dividing the aforementioned annular space between the rotor and the stator into a plurality of operating chambers which communicate, in sequence, with the inlet and outlet ports as the rotor rotates. This latter means comprises a plurality of cylindrical roller members individually disposed within the recesses in the rotor. These roller members are freely rotatable and are each engaged in rolling friction contact with the surface of the rotor recess and with the inner surface of the stator, each of the rollers defining one circumferential limit of each of two immediately adjacent operating chambers.

Other and further objects of the present invention will be apparent from the following description and claims and are illustrated in the accompanying drawings which, by way of illustration, show preferred embodiments of the present invention and the principles thereof and what is now considered to be the best mode contemplated for applying these principles. Other embodiments of the invention embodying the same or equivalent principles may be used and structural changes may be made as desired by those skilled in the art without departing from the present invention and the purview of the appended claims.

In the drawings:

FIG. 1 is a sectional elevation view of a rotary internal combustion engine constructed in accordance with one embodiment of the invention;

FIG. 2 is a detail sectional view illustrating a sealing construction which may be used to seal off a part of the internal operating space of the engine;

FIG. 3 is a detail sectional view taken approximately along line 3—3 of FIG. 2;

FIG. 4 is a sectional elevation view of the engine taken approximately along line 4—4 in FIG. 1;

FIG. 5 is a detail view illustrating a particular roller construction which may be employed in the invention;

FIG. 6 is a detail view illustrating an alternate roller construction;

FIG. 7 is a sectional elevation view taken approximately along line 7—7 of FIG. 2; and FIG. 8 is a simplified sectional elevation view, similar to FIG. 2, of another embodiment of the invention.

The internal combustion engine 10 illustrated in FIGS. 1–4 and 7, which comprises a preferred embodiment of the invention, includes a stator formed by a central annular member 11 and a pair of end bells 12 and 13. The inner surface 14 of the hollow stator member 11 is generally elliptical in configuration, the preferred configuration for this surface being described in greater detail hereinafter. The surface 14 and the generally planar inner surfaces of the end bells 12 and 13 define an enclosed chamber or bore; an inlet port 15 and an outlet port 16 (FIG. 4) are provided in the central stator member 11 to afford access to the interior of the stator in operation of the engine.

The internal combustion engine 10 further includes rotor means 17 rotatably mounted within the interior of the stator, between internal surfaces of the end bells 12 and 13. The rotor means 17 comprises a rotor 18 that is mounted upon an operating shaft 19. The shaft 19 is journalled in suitable bearings mounted within the end bells 12 and 13 of the engine. Thus, a pair of ball bearings 20 and 22 may be employed to support the right-hand end of the shaft 19 within the end bell 12, in conventional manner. In addition, it may be desirable to provide a labyrinth-type seal or other oil seal on the shaft 19, the oil seal being generally indicated by the reference numeral 24. Since any desired kind of oil seal may be utilized without departing from the present invention, the internal construction of the seal is not shown in detail in the drawings. The seal 24 may be disposed in a housing 26, and an additional ball track 28 may be formed between the housing 26 and the inner race of the bearing 20. A suitable end cap 30 may be provided for the end bell 12 at the right-hand side of the engine, as seen in FIG. 1 and an additional O-ring seal 32 may be utilized between the end cap 30 and the extension portion of the shaft 19.

The mounting arrangement at the other end of the shaft 19, the left-hand end as seen in FIG. 1, is essentially the same as that described hereinabove. Thus, the shaft may be mounted within the end bell 13 by means of a pair of ball bearings 21 and 23. A suitable oil seal 25, having a housing 27, is also provided at this end of the shaft, with an additional ball track 29 between the housing 27 and the inner race of the bearing 21. The end cap for the end bell 13 is indicated by the reference numeral 31; this end cap may be provided with an additional O-ring seal 33. In the illustrated construction, a flywheel 35 is mounted on the left-hand end of the shaft 19 as seen in FIG. 1. The two end bells 12 and 13 of the engine may be mounted in a suitable bracket 36 to afford a convenient means for supporting the engine; any other desired mounting bracket or other suitable mounting means may be utilized.

As best shown in FIG. 4, the central rotor member 18 is provided with four circumferentially spaced axially extending recesses 41, 42, 43 and 44 which extend inwardly from the outer surface 45 of the rotor. The base portion of each of the recesses is preferably of semi-circular configuration, but the side walls of the recesses may be generally planar in configuration as shown in FIG. 4. Preferably, the leading edge of the recess 41 is provided with a hardened metal or metal-ceramic insert 46, and the trailing edge of the recess is provided with a similar hard metal or metal-ceramic insert 47.

As shown in FIG. 4, the rotor 18 defines, with the stator member 11, a generally annular space 48 of varying radial dimension. In accordance with the present invention, means are provided for dividing the annular space 48 into a plurality of chambers 51, 52, 53 and 54 which communicate in sequence with the inlet and outlet ports 15 and 16 when the rotor 18 is rotated. The direction of rotation of the member 18 is indicated in FIG. 4 by the arrow A. The dividing means comprises four cylindrical roller members 61, 62, 63 and 64 which are freely rotatably disposed within the recesses 41, 42, 43 and 44 respectively. Each of the rollers 61—64 is engaged in rolling friction contact with a surface of the recess in which it is mounted, although not always with the same surface, since the position of the roller within the recess changes during operation of the engine as described more fully hereinafter. Furthermore, each of the rollers 61—64 is engaged in rolling friction contact with the inner surface 14 of the central stator member 11. Thus, each of the rollers 61—64 defines one circumferential limit of each of the two immediately adjacent operating chambers. For instance, the roller 62 defines the leading edge or limit of the operating chamber 51 and the trailing limit of the operating chamber 52. Similarly, the roller 63 defines the leading circumferential limit of the chamber 52 and the trailing limit or edge of the chamber 43. A corresponding relation is apparent with respect to the remaining rollers 61 and 64.

In addition to the principal rotor member 18, the rotor means 17 of the engine 10 includes a pair of end plates, sometimes referred to hereinafter as sealing plates, which are designated by the reference numerals 66 and 67. The sealing plate 66 is secured to the rotor 18 by suitable means such as a plurality of recessed screws 68, the surface of the sealing plate opposite the rotor 18 being disposed in face-to-face relation to the inner surface of the end bell 12. Similarly, the sealing plate 67 is disposed in face-to-face sealing relation with the inner surface of the end bell 13. The sealing plate 67 is secured to the rotor 18 by the screws 69. Each of the sealing plates 66 and 67 is of circular configuration; the end plates, however, are preferably of substantially greater diameter than the rotor 18. The sealing plate 66 extends into a circular groove 70 in the stator member 11, whereas the sealing plate 67 extends into similar groove 71 at the opposite side of the stator member 11. This construction affords an improved seal at the ends of the rotor.

In many instances, it may be desirable to provide specific sealing means within the engine 10, between the rotor and stator, in addition to the seal provided by a close-tolerance fit between the sealing plates 66 and 67 and the mating portions of the engine stator. Thus, and as shown in FIGS. 1 and 7, the sealing plate 66 may be provided with a recess in the portion thereof facing the bearing 20. In this recess, a pair of sealing elements 73 and 74 may be mounted, being held in place by a clamping ring 75. Actually, the sealing element 74 fits into a recess in the outer race of the bearing 20. The sealing elements 73 and 74 are preferably formed from a high temperature material such as a known carbon-ceramic mixture. A similar constuction may be employed at the point of engagement of the sealing member 67 with the outer race of the bearing 21.

It may also be desirable to afford additional sealing means between the sealing member 66, the internal surface of the end bell 12, and the groove 70 in the central stator member 11. One construction which may be employed for this purpose is shown in FIGS. 2 and 3. As illustrated therein, the sealing member 66 may be provided with a pair of angularly-disposed grooves within which resilient sealing elements 77 and 78 are mounted. Actually, four such pairs of sealing elements would be provided, each aligned with the central portion of one of the rotor recesses 41—44 (see FIG. 2). The resilient sealing elements 77 and 78 are forced tightly into the grooves in the member 66 and form an effective seal both with the internal surface of the groove 70 in the central stator member 11 and with the face of the end bell 12.

It may also be desirable to afford a positive means for forcing the resilient sealing elements 77 and 78 into engagement with the stator. Thus, and as best shown in FIG. 4, a pair of small plungers 81 and 82 may be mounted within apertures 83 and 84 in the sealing plate 66. The plungers 81 and 82 are aligned with the central portions of the sealing elements 77 and 78, respectively, as indicated in FIG. 3. The inner portions of the apertures 83 and 84, in which the plungers 81 and 82 are inserted, may be filled by plugs 85 and 86, respectively. In operation, the rapid rotation of the sealing plate 66, which forms a part of the engine rotor, impels the plungers 81 and 82 outwardly of the apertures 83 and 84, forcing the sealing elements 77 and 78 into tight sealing engagement with the stator. Wear on the sealing elements 77 and 78 is effectively compensated by the continuous pushing action of the plungers, which maintain the sealing elements in effective sealing contact with the stator. Of course, a similar auxiliary sealing arrangement can be employed with respect to the other sealing plate 67 (FIGS. 1 and 7). It should be emphasized, however, that operation of the engine 10 is not dependent upon the use of this particular sealing arrangement, which merely illustrates a preferred construction, since adequate sealing should be obtainable if the mating surfaces of the sealing plates 66 and 67 and the stator are lapped or otherwise machined to close tolerances to afford leakage paths of maximum length and minimum cross-sectional area.

In considering operation of the engine 10, particular attention should be directed to FIG. 4. As noted hereinabove, the port 15 in the central stator element 11 is the intake port of the engine, the port 16 being the exhaust port. With the rotor 18 in the position illustrated in FIG. 2, the operating chamber 51 has been filled with an air-fuel mixture through the intake port 15. As rotor 18 continues its rotation, as indicated by the arrow A, through a relatively small arc, the roller 61 effectively seals off the chamber 51 from the intake port 15. That is, the engagement of the roller 61 with the side plate 47 of the recess 41 and with the internal surface 14 of the stator element 11 seals off the trailing end of the chamber 51 and prevents further entry of the fuel mixture from the port 15 thereinto.

With continued rotation of the rotor 18, the chamber 51 defined by the sealing rollers 61 and 62 approaches the position shown for the chamber 52 in FIG. 4. The radial dimension of the operating chamber is effectively reduced, due to the change in contour of the central stator element 11. Consequently, the air-fuel mixture in the chamber is compressed as the chamber approaches the spark plug or other suitable ignition device 91 that is located slightly less than 180° around the stator from the intake port 15. At this point, the spark plug 91 is fired, igniting the air-fuel mixture within the chamber. In FIG. 2, the chamber 52, which contains a compressed air-fuel mixture, is shown approximately in the position in which ignition takes place.

Following ignition, the continued rotation of the rotor again effectively enlarges the operating chamber, since it brings the chamber into a further large-diameter portion of the stator element 11 at the right-hand side of the engine as seen in FIG. 2. At this point, expansion of the combustion products and other gases present in the chamber takes place. Thereafter, the operating chamber comes into alignment with the exhaust port 16, and expanded gases and other combustion products are exhausted through the exhaust port.

As noted hereinabove, the generally annular space 48 within the stator of the engine is substantially elliptical in configuration. However, although a fully elliptical surface could be employed, it is preferred to utilize a less regular and more specialized configuration of the particular kind illustrated in FIG. 4. Thus, the section 93 of the internal surface 14 of the stator 11 conforms to a circular configuration having an internal diameter matched as closely as possible to the external diameter of the rotor 18. Thus, as the rotor revolves, the portion of the rotor surface 45 disposed adjacent the section 93 of the stator surface affords an effective seal and prevents leakage between the inlet and exhaust ports 15 and 16. Using this construction, of course, it is necessary to make each of the recesses deep enough to receive the complete sealing roller associated therewith, in order to prevent jamming of the engine. Of course, whenever any of the sealing rollers 61—64 is engaged with the sealing portion 93 of the stator, it engages the stator surface in rolling contact and also engages the surface of its recess to provide an effective seal in this area.

The next section 94 of the stator surface 14 adjacent the section 93, in a clockwise direction, is one of expanding radius. This section 94 is followed by a section 95 of diminishing radius in which the compression cycle of the engine is initiated. Stator sections 94 and 95 together afford an intake section having an average radius substantially larger than the radius of the rotor 18. Stator section 95 is followed by a section 96 of substantially constant radius, only slightly larger than the rotor, this being the high pressure section of the stator. The next section 97 of the stator surface is of substantially constant radius, considerably larger than the section 96, forming the expansion chamber for the burning gases of the engine. The final section 98 is a transition section leading to the sealing section 93. This stator configuration is more effective than an exactly elliptical configuration, and affords more positive compression and expansion suited to the operation of an internal combustion engine.

With the rotor 18 in the position illustrated in FIG. 4, it is seen that each of the sealing rollers 61, 62 and 64 is engaged in sealing, rolling contact with the trailing surface of the recess in which the roller is mounted. That is, the roller 61 is in engagement with the hardened facing plate 47, and the rollers 62 and 64 engage the hardened facing plates in the recesses 42 and 44 which correspond to the plate 47. The roller 63, however, is shown in engagement with the hardened face plate 103 on the leading edge of the recess 43. Ordinarily, each of the rollers is engaged with the trailing edge of the recess, due to the rotational movement of the rotor 18. Each of the rollers, however, moves from engagement with the trailing edge of the recess and into engagement with the leading edge as the roller traverses the compression section 96 of the stator.

The movement of each roller from engagement with the trailing edge of the recess to the leading edge and back again, during each operational cycle, is caused by varying pressures within the isolated operating chambers 51—54. Thus, as the roller 62 approaches the combustion position adjacent the spark plug 91, the pressure in the chamber 51 behind the roller 62 increases substantially due to compression caused by the reduced internal diameter of the stator section 96 as compared with the stator section 95. On the other hand, the pressure in the chamber 52 ahead of the roller 62 reduces substantially, due to the expansion of the gases of the chamber 52 as the latter approaches the exhaust port 16. The pressure differential across the roller 62 causes the roller to be driven from engagement with the trailing edge 104 of the recess 42 and into engagement with the leading edge 105 of the recess. This movement takes place before the firing of the spark plug 91 to ignite the mixture in the chamber 51. The ignition of the air-fuel mixture within the operating chamber further increases the pressure in the chamber behind the roller and holds the roller in engagement with the leading edge of the recess until expansion of the burnt gases in the section 97 of the stator reduces the pressure differential across the roller to an extent sufficient to permit the roller to fall back into engagement with the trailing edge of the recess. In any event, the roller returns to engagement with the trailing edge of the recess by the time that the operating chamber behind the roller is vented through the exhaust port 16.

For effective operation of the engine 10, it is of course necessary to have a relatively good seal between the ends of the rollers 61—64 and the two end plates or sealing plates 66 and 67. An adequate seal can be obtained, in at least some instances, by precision machining of the rollers and by affording smooth internal surfaces on the sealing plates 66 and 67. The latter, for example, may be lapped to afford the requisite smooth surface. FIG. 6 illustrates a modified construction for the rollers which may be desirable in at least some instances. The roller 161 shown therein is provided with a pair of sealing elements or caps 162 and 163 at the ends of the roller. The main body of the roller 161 may be formed from relatively hard steel, the end portions 162 and 163 comprising a relatively hard and resilient facing material such as a metal-ceramic material.

FIG. 7 illustrates another modification of the roller construction, in the form of a roller 164. The roller 164 is provided with a pair of recesses 165 and 166 at the ends thereof. In the recesses 166 there is mounted a shallow cup-shaped resilient sealing member 168, the rim of the sealing member 168 being disposed in engagement with the internal surface of the rotary sealing member 66. In the base of the recess 166, and behind the cup-shaped sealing member 168, a plurality of spherical support elements 170 are mounted. At the opposite side of the roller 164, a second cup-shaped sealing member 167 is disposed within the recess 165 in position to engage the sealing plate 67, the base of the sealing element 167 being spaced from the bottom of the recess 165 by a plurality of ball-bearing elements 169.

With the construction illustrated in FIG. 7, the seal between the sealing plates 66 and 67 and the roller 164 is provided by the resilient sealing elements 167 and 168, and it is not necessary the ends of the main body of the roller 164 engage the sealing plates. At the same time, the illustrated construction permits relative rotational movement of the roller with respect to the sealing plates. This construction affords a tight seal between the ends of the roller and the rotary sealing plates and permits convenient replacement of the sealing elements when necessitated by wear during use of the engine.

The engine construction illustrated in FIGS. 1–5 affords a number of substantial advantages in comparison with previously known rotary engine devices. In the first place, the radially moveable sealing rollers 61—64 engage both the rotor and the stator in rolling friction contact. Consequently, substantially less wear occurs on the rollers, the rotor and the stator than takes place in devices in which sealing elements are scraped or dragged across the surface of either the stator or the rotor. At the same time, because there is no axial thrust applied to any of the rollers, wear at the ends of the rollers is not too great. The improved operating qualities of the engine are enhanced by the fact that the rollers do not directly engage the stator, but rather engage the sealing plates 66 and 67 which rotate conjointly with the main portion 18 of the rotor means 17.

Constructon of the engine 10 is quite simple, even if the modified roller structures shown in either of FIGS. 6 and 7 are employed. Eventually, of course, there may be some loss of compression due to scoring of the rollers 61—64. However, it is a quite simple matter to replace all of these rollers at any time, so that maintenance of the engine is an inexpensive procedure. As noted hereinabove, the use of the rollers 61—64 affords improved sealing between the individual operating chambers of the engine, so that relatively high compression ratios can be safely maintained. Because the rollers are effectively moved from engagement with the trailing edges of their recesses to the leading edges before ignition of the air-fuel mixture takes place, there is little or no opportunity for excessive wear which might be caused by driving the roller through this movement in response to ignition of the fuel.

FIG. 8 illustrates a rotary power device 210 which is in many respects essentially similar to the internal combustion engine 10 described hereinabove. The device 210, however, is a compressor pump of the kind employing radially movable sealing elements, and is not an engine.

Pump 210 includes rotor means 17 which may be essentially identical in construction to the rotor means 17 of the first described embodiment. The rotor means, as before, comprises a shaft 19 upon which a central rotor member 18 is mounted. Preferably, two end sealing plates are provided on the central rotor 18, only the one plate 67 being illustrated in FIG. 8. The mounting screws for the other rotor plate are indicated by the reference numerals 68. As before, the rotor 18 is provided with four circumferentially spaced axial extending recesses 41, 42, 43 and 44 within which the cylindrical rollers 61, 62, 63 and 64 are mounted.

The stator 211 of the pump 210, however, is quite different from the stator 11 of the engine 10. That is, the internal contour of the stator surface 214 does not afford the same series of compression and expansion chambers as in the internal combustion engine 10. A first section 215 of the stator surface 214 is a sealing section, having a radius approximately equal to the radius of the rotor 18. Section 215 is followed by an intake section 216 of substantially greater average radius than the radius of the rotor 18. The next section 217 of the stator is a compression section which terminates at a second sealing section 218 that is similar to the sealing section 215. The section 218 is followed by an intake or expansion section 219 which is similar to the section 216, whereas the final section 220 of the stator surface 214 has a contour similar to that of the section 217 and comprises a compression section. An intake port 221 is provided in the stator 211 closely adjacent the juncture of stator sections 215 and 216, an outlet port 222 being located somewhat less than 180° from the inlet port 221 adjacent the juncture of the stator sections 217 and 218. A similar pair of ports, comprising an inlet port 223 and an outlet port 224, are afforded in the other half of the stator.

In operation, suitable drive means are connected to the shaft 19 to rotate the shaft in the direction indicated by the arrow B. Air or other gas is admittted through the port 221 into the operating space between the rotor 18 and the stator surface 214. With the device in the position shown in FIG. 8, the gas is admitted into the operating chamber 225 between the two sealing rollers 61 and 64, which operate in the same way as the sealing rollers in the previously described embodiment of the invention.

With continued rotation of the rotor 18, the operating chamber 225 revolves in a clockwise direction. At first, the size of the chamber is relatively large, due to the increasing diameter of the intake section 216 of the stator. Subsequently, however, the effective volume of the moving chamber 225 shrinks as it enters the compression section 217. Accordingly, the air or other gas is exhausted through the port 222 under a considerably greater pressure than that at which it enters the pump. The same action takes place on the opposite side of the pump, the air or other gas entering the pump through the port 223 and being forced outwardly thereof under pressure through the port 224. It is thus seen that the pump 210 retains the advantages of the internal combustion engine 10 and incorporates those advantages in a pump structure of otherwise conventional form. Similarly, the advantages of the roller sealing elements can be incorporated in other forms of rotary power devices, such as diesel-cycle internal combustion engines, turbines, and the like.

Hence, while preferred embodiments of the invention have been described and illustrated, it is to be understood that they are capable of variation and modification, and I therefore do not wish to be limited to the precise details set forth, but desire to avail myself of such changes and alterations as fall within the purview of the following claims.

I claim:

1. A rotary power device comprising: a rotor of circular cross-sectional configuration having a plurality of circumferentially spaced axially extending recesses therein; a stator, disposed in encompassing relation to said rotor and forming therewith a generally arcuate operating space, said stator comprising, seriatim, an intake section, a compression section, and a sealing section; and means for dividing said arcuate space into a plurality of operating chambers comprising a corresponding plurality of radially movable cylindrical sealing members each freely rotatably disposed within one of said rotor recesses in rolling friction contact with the surface of the rotor recess and the inner surface of the stator, each roller defining one circumferential limit of each of two immediately adjacent operating chambers, said rollers each having a cup-like recess at each end thereof with a sealing element disposed therein and a plurality of ball bearing elements interposed between the sealing element and the base of the roller recess.

2. A rotary power device comprising: a rotor of circular cross-sectional configuration having a plurality of circumferentially spaced axially extending recesses therein; a cylindrical stator, having closed ends, disposed in encompassing relation to said rotor and forming therewith a generally arcuate operating space, said stator comprising, seriatim, an intake section, a compression section, and a sealing section, of varying radii, said stator having a pair of circular grooves at the opposite ends thereof, said grooves being larger in radius than the maximum radius of any of said sections; a pair of circular end sealing plates mounted on said rotor for rotation therewith and extending into said grooves to seal off the end portions of said arcuate space; means for dividing said arcuate space into a plurality of operating chambers comprising a corresponding plurality of radially movable cylindrical sealing members each freely rotatably disposed within one of said rotor recesses in rolling friction contact with the surface of the rotor recess and the inner surface of the stator, each roller defining one circumferential limit of each of two immediately adjacent operating chambers; and individual end sealing means, comprising resilient end facing elements mounted in and facing outwardly of individual cup-like receptacles at the ends of each roller, for engaging said end sealing plates to minimize leakage between said chambers around the ends of the rollers.

3. A rotary power device comprising: a rotor of circular cross-sectional configuration having a plurality of circumferentially spaced axially extending recesses therein; a stator, disposed in encompassing relation to said rotor and forming therewith a generally arcuate operating space, said stator comprising, seriatim, an intake section, a compression section, and a sealing section, of varying radii, said stator having a pair of circular grooves at the opposite ends thereof, said grooves being larger in radius than the maximum radius of any of said sections; a pair of circular end sealing plates mounted on said rotor for rotation therewith and extending into said grooves to seal off the end portions of said arcuate space; means for dividing said arcuate space into a plurality of operating chambers comprising a corresponding plurality of radially movable cylindrical sealing members each freely rotatably disposed within one of said rotor recesses in rolling friction contact with the surface of the rotor recess and the inner surface of the stator, each roller defining one circumferential limit of each of two immediately adjacent operating chambers; and auxiliary sealing means comprising a plurality of resilient sealing elements mounted in and facing outwardly of said end sealing plates and engaging the walls of said stator grooves to inhibit leakage in a circumferential direction.

4. A rotary power device comprising: a rotor of circular cross-sectional configuration having a plurality of circumferentially spaced axially extending recesses therein; a stator, disposed in encompassing relation to said rotor and forming therewith a generally arcuate operating space, said stator comprising, seriatim, a sealing section having a radius approximately equal to the rotor radius, an intake section of progressively increasing radius, and a compression section of progressively decreasing radius; means for diving said arcuate space into a plurality of operating chambers comprising a corresponding plurality of radially movable cylindrical sealing members each freely rotatably disposed within one of said rotor recesses in rolling friction contact with the surface of the rotor recess and held in rolling friction contact with the inner surface of the stator by centrifugal force, each roller defining one circumferential limit of each of two immeditaely adjacent operating chambers, end sealing means, comprising a pair of end sealing elements mounted on said rotor for rotation therewith and engageable with said stator, for sealing off the ends of each of said operating chambers, said end sealing means further comprising resilient end facing elements mounted in and facing outwardly of individual cup-like receptacles at the ends of each roller and engaging said end sealing elements to minimize leakage between said chambers around the ends of the rollers; and auxiliary sealing means comprising a plurality of resilient sealing elements mounted in and facing outwardly of said end sealing elements and engaging the walls of the stator to inhibit leakage in a circumferential direction.

5. A rotary power device comprising: a rotor of circular cross-sectional configuration having a plurality of circumferentially spaced axially extending recesses therein; a cylindrical stator, disposed in encompassing relation to said rotor and forming therewith a generally annular operating space, said stator comprising, seriatim, an intake section having an average radius substantially larger than the rotor radius, a compression section having an average radius substantially smaller than said intake section and only slightly larger than the rotor radius, and a sealing section having a radius approximately equal to the rotor radius, said stator further having a pair of constant-radius grooves greater in radius than any of the aforesaid sections at the ends thereof; means for dividing said annular space into a plurality of operating chambers comprising a corresponding plurality of cylindrical sealing members each disposed within one of said rotor recesses for radial movement therein and in rolling friction contact with the surface of the rotor recess and the inner surface of the stator, each roller defining one circumferential limit of each of two immediately adjacent operating chambers; means for sealing off the ends of said operating chambers, comprising a pair of generally disc-shaped sealing plates affixed to the ends of said rotor and extending into said constant-radius grooves in close-fitting engagement therewith; and auxiliary sealing means comprising a plurality of resilient sealing elements mounted in and facing outwardly of said sealing plates and engaging the walls of said grooves to inhibit leakage in a circumferential direction.

6. A rotary internal combustion engine comprising: a rotor of circular cross-sectional configuration having a plurality of circumferentially spaced axially extending recesses therein; a stator, disposed in encompassing relation to said rotor and forming therewith a generally annular operating space, said stator comprising, seriatim, an intake section of progressively increasing radius having an average radius substantially larger than the rotor radius, a first compression section of progressively decreasing radius, a further compression section having a substantially constant radius only slightly larger than the rotor radius, an expansion section having an average radius substantially larger than the rotor radius, and a sealing section having a radius approximately equal to the rotor radius, each such section including a substantially angular portion of said operating space; means for dividing said annular space into a plurality of operating chambers comprising a corresponding plurality of radially movable cylindrical sealing members each freely rotatably disposed within one of said rotor recesses in rolling friction contact with the surface of the rotor recess and the inner surface of the stator, each roller defining one circumferential limit of each of two immediately adjacent operating chambers; ignition means located approximately at the juncture of said compression and expansion sections; a pair of circular end sealing plates mounted on said rotor for rotation therewith and engageable in sealing relation with said stator, for sealing off the ends of all of said operating chambers; individual end sealing means comprising resilient end facing elements mounted in and facing outwardly of individual cup-like receptacles at the ends of each roller, for engaging said end sealing plates to minimize leakage between said chambers around the ends of the rollers; and auxiliary sealing means comprising a plurality of resilient sealing elements mounted in and facing outwardly of said end sealing plates into engagement with said stator to inhibit leakage in a circumferential direction.

References Cited in the file of this patent

UNITED STATES PATENTS

| | | |
|---|---|---|
| 813,018 | Okun | Feb. 20, 1906 |
| 1,271,585 | Klise | July 9, 1918 |
| 1,749,121 | Barlow | Mar. 4, 1930 |
| 2,065,008 | Madle | Dec. 22, 1936 |
| 2,068,570 | Ross | Jan. 19, 1937 |
| 2,124,542 | Chisholm | July 26, 1938 |
| 2,162,851 | Lister | June 20, 1939 |
| 2,241,607 | Long | May 13, 1941 |
| 2,283,433 | Gross | May 19, 1942 |
| 2,298,525 | Briggs | Oct. 13, 1942 |
| 2,382,259 | Rohr | Aug. 14, 1945 |
| 2,631,544 | Wilcox | Mar. 17, 1953 |
| 2,725,013 | Vlachos | Nov. 29, 1955 |
| 2,737,121 | Badalini | Mar. 6, 1956 |